United States Patent
Suetsugu et al.

(10) Patent No.: US 11,279,323 B2
(45) Date of Patent: Mar. 22, 2022

(54) PATTERNED CONDUCTOR, SHEET WITH CONDUCTOR, HEATING PLATE, VEHICLE, AND MANUFACTURING METHOD OF PATTERNED CONDUCTOR

(71) Applicant: DAI NIPPON PRINTING CO., LTD., Tokyo-to (JP)

(72) Inventors: Hirotoshi Suetsugu, Tokyo-to (JP); Manabu Hirakawa, Tokyo-to (JP); Satoshi Goishihara, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 484 days.

(21) Appl. No.: 16/317,682

(22) PCT Filed: Jul. 12, 2017

(86) PCT No.: PCT/JP2017/025452
§ 371 (c)(1),
(2) Date: Jan. 14, 2019

(87) PCT Pub. No.: WO2018/012553
PCT Pub. Date: Jan. 18, 2018

(65) Prior Publication Data
US 2019/0248335 A1 Aug. 15, 2019

(30) Foreign Application Priority Data
Jul. 12, 2016 (JP) .............................. JP2016-137707

(51) Int. Cl.
*B60S 1/02* (2006.01)
*H01B 5/14* (2006.01)
(Continued)

(52) U.S. Cl.
CPC ................. *B60S 1/026* (2013.01); *B60S 1/02* (2013.01); *B60S 1/586* (2013.01); *H01B 5/14* (2013.01); *H05B 3/20* (2013.01); *H05B 3/84* (2013.01)

(58) Field of Classification Search
CPC . B60S 1/026; B60S 1/02; B60S 1/586; H01B 5/14; H05B 3/84; H05B 3/20; H05B 2203/013; H05B 2203/002
See application file for complete search history.

(56) References Cited

U.S. PATENT DOCUMENTS

2012/0313880 A1    12/2012  Geaghan et al.
2017/0258268 A1*    9/2017  Kazanas .................. A47J 37/06

FOREIGN PATENT DOCUMENTS

EP    2 787 101 A1     10/2014
JP    H08-0072674 A     3/1996
(Continued)

OTHER PUBLICATIONS

Aug. 22, 2017 International Search Report issued in International Patent Application No. PCT/JP2017/025452.
(Continued)

*Primary Examiner* — Shawntina T Fuqua
(74) *Attorney, Agent, or Firm* — Oliff PLC

(57) ABSTRACT

A patterned conductor that includes a metal linear conductor positioned on one placement surface that has a main cut surface orthogonal to its longitudinal direction, a plurality of metal crystal grains. In the main cut surface of thereof, a metal crystal grain(s) having a length $h_0$ along a normal direction to the placement surface, which length is larger than one third of a height H of the linear conductor along the normal direction to the placement surface. A minimum value of a ratio $(h_0/w_0)$, which is a ratio of the length $h_0$ of the metal crystal grain(s) along the normal direction to the (Continued)

placement surface with respect to a length $w_0$ along the placement surface, is not less than 1.2.

16 Claims, 8 Drawing Sheets

(51) Int. Cl.
  *H05B 3/84* (2006.01)
  *H05B 3/20* (2006.01)
  *B60S 1/58* (2006.01)

(56) References Cited

FOREIGN PATENT DOCUMENTS

| | | |
|---|---|---|
| JP | 2009-138245 A | 6/2009 |
| JP | 2012-178556 A | 9/2012 |
| JP | 2013-112891 A | 6/2013 |
| JP | 5224203 B1 | 7/2013 |
| JP | 2013-173402 A | 9/2013 |
| JP | 2016-102056 A | 6/2016 |
| WO | 2008/149772 A1 | 12/2008 |
| WO | 2016/080406 A1 | 5/2016 |
| WO | 2016/084019 A1 | 6/2016 |

OTHER PUBLICATIONS

Mar. 13, 2018 Office Action issued in Japanese Patent Application No. 2017-552112.
Aug. 6, 2020 Office Action issued in Chinese Patent Application No. 201780042205.8.
Jan. 15, 2019 International Preliminary Report on Patentability issued in International Patent Application No. PCT/JP2017/025452.
Feb. 7, 2020 Search Report issued in European Patent Application No. 17827679.6.
Feb. 3, 2020 Office Action issued in Chinese Patent Application No. 201780042205.8.
Jun. 29, 2021 Office Action issued in Japanese Patent Application No. 2018-090652.
Jan. 7, 2022 Office Action issued in Japanese Patent Application No. 2018-090652.

* cited by examiner

PATTERNED CONDUCTOR, SHEET WITH CONDUCTOR, HEATING PLATE, VEHICLE, AND MANUFACTURING METHOD OF PATTERNED CONDUCTOR

TECHNICAL FIELD

The present invention relates to a patterned conductor, a sheet with conductor having the patterned conductor, a heating plate having the patterned conductor or the sheet with conductor, and a vehicle having the heating plate. In addition, the present invention relates to a manufacturing method of a patterned conductor.

BACKGROUND ART

A conductor having a regular or irregular pattern has been conventionally used in widespread. For example, such a conductor is employed in a defroster for use in a vehicle front window (windshield), a heating electrode for a windowpane of a building, a position detection electrode of a touchpanel sensor, and so on. The patterned conductor used therein is energized to generate heat so as to serve as a defroster or a heater, or so as to serve as a sensor. For example, in JP2013-173402A and JP8-72674A, a patterned conductor is incorporated in a see-through heating plate, and is employed in a windowpane. In the heating plate, a temperature of the patterned conductor is elevated by its resistance heat upon being energized. The elevated temperature of the windowpane including the heating plate can defog the windowpane or unfreeze snow or ice on the windowpane, so that the see-through property through the windowpane can be ensured.

The patterned conductor used for this purpose is required to have both a high conductivity and a high see-through property, in terms of its function. The larger a sectional area of a linear conductor forming the patterned conductor is, the higher the conductivity of the patterned conductor becomes. The narrower a line width of the linear conductor forming the patterned conductor is, the better the see-through property of the patterned conductor becomes.

Regarding a conventional patterned conductor, in a section (referred to also as "main cut surface" hereafter) orthogonal to a longitudinal direction of the linear conductor forming the patterned conductor, a length of the linear conductor along a surface of a substrate supporting the patterned conductor changes in a normal direction of the surface of the substrate. As a specific example, as shown in FIGS. 15 and 16, a main cut surface of a linear conductor 131 forming a patterned conductor has a trapezoidal shape. A longer lower base of the trapezoidal shape corresponds to a width of the linear conductor, which is visible from the normal direction of the patterned conductor. As compared with a rectangular main cut surface, even when the trapezoidal main cut surface has the same visible width as that of the rectangular main curt surface, the trapezoidal main cur surface has a smaller sectional area, because the main cut surface is trapezoidal in shape. Thus, as compared with a patterned conductor having a rectangular main cut surface, which is schematically shown in FIG. 3, the linear conductor having the trapezoidal main cut surface has a lower conductivity. In addition, since the main cut surface is trapezoidal in shape, even when it has the same sectional area as that of a rectangular main cut surface, a visible width of the linear conductor is wider. Thus, as compared with a patterned conductor having a rectangular main cut surface, the linear conductor having a trapezoidal main cut surface has an inferior see-through property. Namely, the trapezoidal section cannot achieve both a high see-through property and a high conductivity. However, a trapezoidal shape of a main cut surface of a linear conductor results from an etching step in the course of manufacturing a patterned conductor, and thus it is difficult to allow a linear conductor to have a main cut surface that is rectangular in shape.

DISCLOSURE OF THE INVENTION

The present invention has been made in view of the above circumstances. The object of the present invention is to provide a patterned conductor having both a high conductivity and a high see-through property. Further, the object of the present invention is to provide a sheet with conductor having the patterned conductor, a heating plate having the patterned conductor or the sheet with conductor, and a vehicle having the heating plate.

A first patterned conductor according to the present invention is a patterned conductor comprising a metal linear conductor positioned on one placement surface, wherein:

the linear conductor includes, in a section orthogonal to a longitudinal direction thereof, a plurality of metal crystal grains; and the linear conductor includes, in one section orthogonal to the longitudinal direction thereof, a metal crystal grain(s) having a length $h_0$ along a normal direction to the placement surface, which length is larger than one third of a height H of the linear conductor along the normal direction to the placement surface, in which a minimum value of a ratio $(h_0/w_0)$, which is a ratio of the length $h_0$ of the metal crystal grain(s) along the normal direction to the placement surface with respect to a length $w_0$ along the placement surface, is not less than 1.2.

A second patterned conductor according to the present invention is a patterned conductor comprising a metal linear conductor positioned on one placement surface, wherein:

the linear conductor includes, in a section orthogonal to a longitudinal direction thereof, a plurality of metal crystal grains; and the linear conductor includes, in one section orthogonal to the longitudinal direction thereof, a metal crystal grain(s) having a length $h_0$ along a normal direction to the placement surface is larger than one third of a height H of the linear conductor along the normal direction to the placement surface, in which an average of a diameter of a circle having the same area as an area of the metal crystal grain is smaller than a half of the height H of the linear conductor along the normal direction to the placement surface.

In the patterned conductor according to the present invention, the linear conductor may contain at least one of copper and aluminum.

In the patterned conductor according to the present invention, the linear conductor may be arranged in a pattern defining a plurality of opening areas, and a value of a ratio (D1/W), which is a ratio of an average D1 of a distance between centers of gravity of the opening areas with respect to a line width W of the linear conductor, may be not less than 50 and not more than 200.

In the patterned conductor according to the present invention, the linear conductor may be arranged in a pattern defining a plurality of opening areas, and regarding a metal crystal grain(s) included in the one section and having a length $h_0$ along a normal direction to the placement surface, which length is larger than one third of a height H along the normal direction to the placement surface, a value of a ratio (D1/w), which is a ratio of an average D1 of a distance between centers of gravity of the opening areas with respect to an average w of a length along the placement surface in said section, may be not less than 40 and not more than 500.

In the patterned conductor according to the present invention, a plurality of the linear conductors may be arranged with a gap(s) therebetween in one direction, each linear conductor extending in a direction not parallel to the one direction, and a value of a ratio (D2/W), which is a ratio of an average D2 of a dimension of the gap along the one direction with respect to a line width W of the linear conductor, may be not less than 50 and not more than 1000.

In the patterned conductor according to the present invention, a plurality of the linear conductors may be arranged with a gap(s) therebetween in one direction, each linear conductor extending in a direction not parallel to the one direction, and regarding a metal crystal grain(s) included in the one section and having the length $h_0$ along the normal direction to the placement surface, which length is larger than one third of the height H of the linear conductor along the normal direction to the placement surface, a value of a ratio (D2/w), which is a ratio of an average D2 of a dimension of the gap along the one direction with respect to an average w of a length along the placement surface in said section, may be not less than 200 and not more than 2400.

In the patterned conductor according to the present invention, regarding a metal crystal grain(s) included in the one section and having the length $h_0$ along the normal direction to the placement surface, which length is larger than one third of the height H of the linear conductor along the normal direction to the placement surface, a value of a ratio (W/w), which is a ratio of a line width W of the linear conductor with respect to an average w of a length along the placement surface in said section, may be not less than 2 and not more than 10.

In the patterned conductor according to the present invention, regarding a metal crystal grain(s) included in the one section and having the length $h_0$ along the normal direction to the placement surface, which length is larger than one third of the height H of the linear conductor along the normal direction to the placement surface, an average of a value of a ratio $(h_0/w_0)$, which is a ratio of the length $h_0$ of the metal crystal grain along the normal direction in said section with respect to the width $w_0$ along the placement surface in said section, may be not less than 2.

In the patterned conductor according to the present invention, regarding a metal crystal grain(s) included in the one section and having the length $h_0$ along the normal direction to the placement surface, which length is larger than one third of the height H of the linear conductor along the normal direction to the placement surface, an average h of a length along the normal direction in said section may be not less than 4.0 μm and not more than 11.5 μm.

In the patterned conductor according to the present invention, regarding a metal crystal grain(s) included in the one section and having the length $h_0$ along the normal direction to the placement surface, which length is larger than one third of the height H of the linear conductor along the normal direction to the placement surface, an average w of a length along the placement surface in said section is not less than 0.5 μm and not more than 5.0 μm.

A sheet with conductor according to the present invention comprises any of the aforementioned patterned conductor according to the present invention.

A heating plate according to the present invention comprises any of the aforementioned patterned conductor according to the present invention, or the aforementioned sheet with conductor according to the present invention.

A vehicle according to the present invention comprises the aforementioned heating plate according to the present invention.

A manufacturing method of a patterned conductor of the present invention is a manufacturing method of a patterned conductor comprising a metal linear conductor positioned on one placement surface, the manufacturing method comprising:

a step of providing a metal film on a substrate;

a step of providing a resist pattern on the metal film, and etching the metal film with the resist pattern serving as a mask; and a step of removing the resist pattern;

wherein in one section of the metal film, the metal film includes a metal crystal grain(s) having a length $h_0$ along a normal direction of the metal film, which length is larger than one third of a height H along the normal direction of the metal film, in which a minimum value of a ratio $(h_0/w_0)$, which is a ratio of the length $h_0$ of the metal crystal grain(s) along the normal direction of the metal film with respect to a length $w_0$ along the placement surface, is not less than 1.2.

The manufacturing method of a patterned conductor of the present invention may further comprise a step of inspecting the metal crystal grain(s) of the metal film.

In the manufacturing method of a patterned conductor of the present invention, the step of inspecting the metal crystal grain(s) of the metal film may include a step of inspecting that, regarding a metal crystal grain(s) included in the one section and having the length $h_0$ along the normal direction of the metal film, which length is larger than one third of the height H of the linear conductor along the normal direction of the metal film, a minimum value of a ratio $(h_0/w_0)$, which is a ratio of the length $h_0$ of the metal crystal grain(s) along the normal direction of the metal film with respect to the length $w_0$ along the metal film in said section, is not less than 1.2.

In the manufacturing method of a patterned conductor of the present invention, the step of inspecting the metal crystal grain(s) of the metal film may further include at least one of the steps of:

regarding a metal crystal grain(s) included in the one section and having the length $h_0$ along the normal direction of the metal film, which length is larger than one third of the height H along the normal direction of the metal film, a step of inspecting that an average of a value of a ratio $(h_0/w_0)$, which is a ratio of the length $h_0$ of the liquid crystal grains along the normal direction of the metal film with respect to the length $w_0$ of the liquid crystal grains along the metal film in said section, is not less than 2;

a step of inspecting that an average h of the length of the metal crystal grain along the normal direction of the metal film in said section is not less than 4.0 μm and not more than 11.5 μm; and a step of inspecting that an average w of the length of the metal crystal grain along the metal film in said section is not less than 0.5 μm and not more than 5.0 μm.

According to the present invention, the patterned conductor can have both a high conductivity and a high see-through property.

MODE FOR CARRYING OUT THE INVENTION

Figure 1:
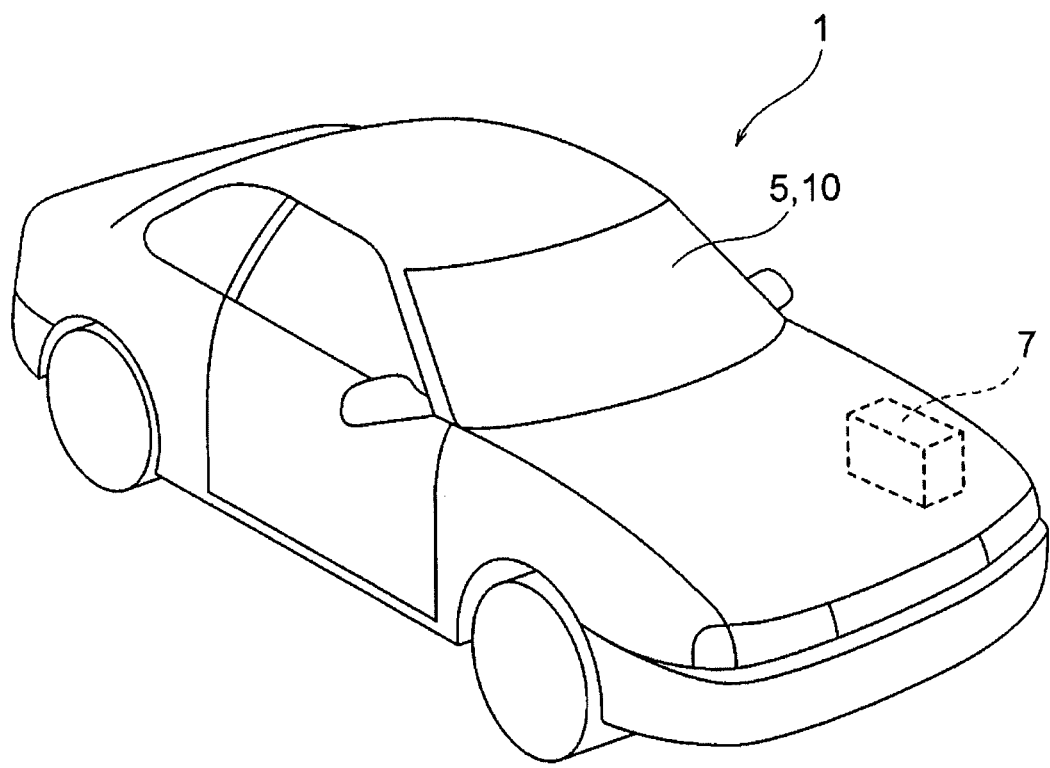
FIG. 1 is a view for explaining an embodiment according to the present invention, which is a perspective view schematically showing a vehicle having a heating plate. In particular, FIG. 1 schematically shows, as an example of the vehicle, a motor vehicle having a front window formed of the heating plate.

An embodiment of the present invention is described herebelow with reference to the drawings. In the drawings attached to the specification, a scale dimension, an aspect ratio and so on are changed and exaggerated from the actual ones, for the convenience of easiness in illustration and understanding.

Further, terms specifying shapes, geometric conditions and their degrees, e.g., terms such as "parallel", "perpendicular", "same", etc. and values of a length and an angle, etc., are not limited to their strict definitions, but should be construed to include a range capable of exerting a similar function.

Figure 2:
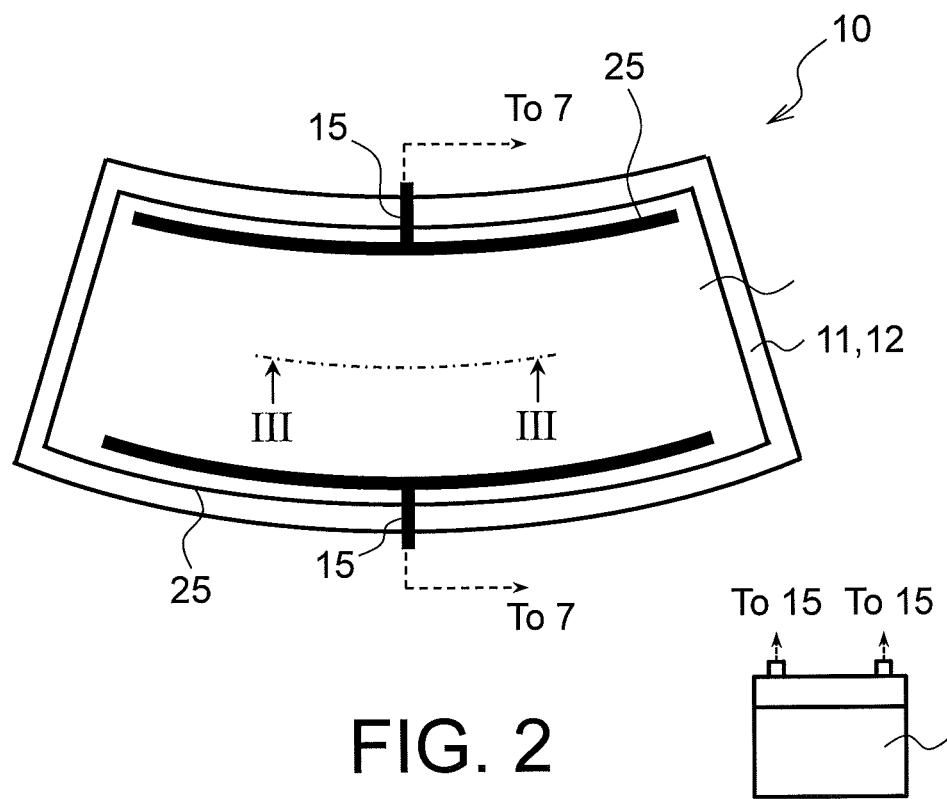
FIG. 2 is a view of the heating plate of FIG. 1 seen from a normal direction of a plate surface thereof.
Figure 3:
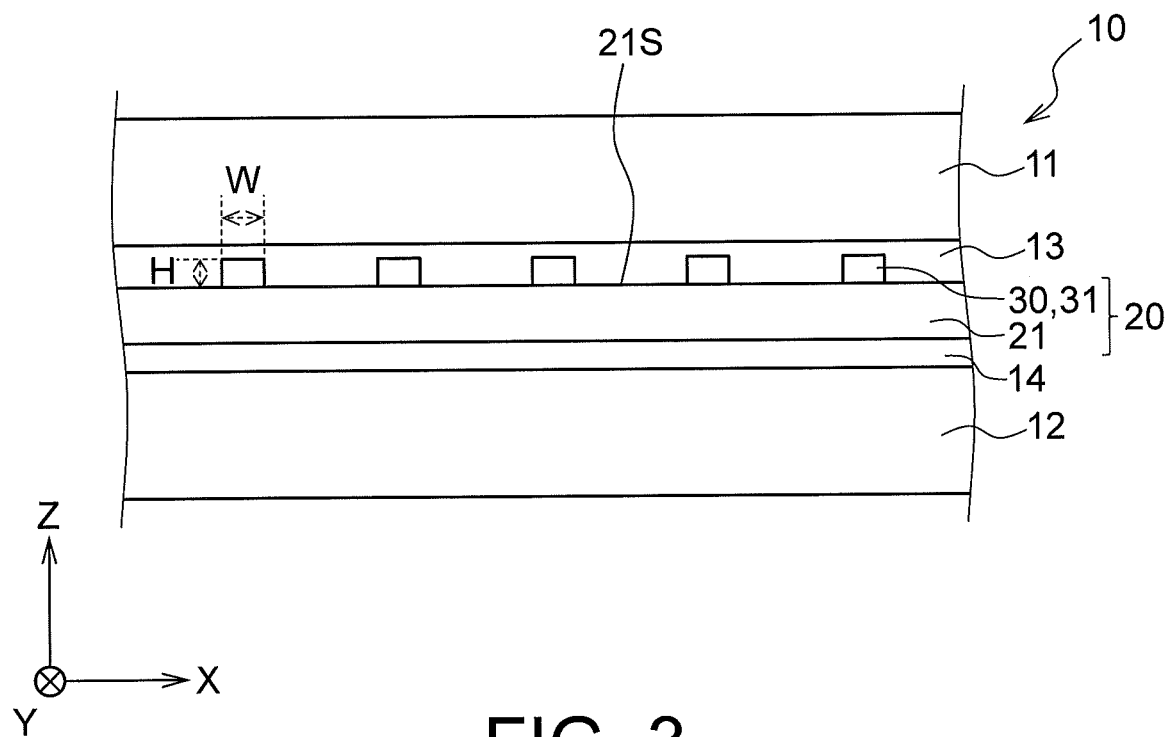
FIG. 3 is a sectional view taken along the III-III line of FIG. 2.

FIGS. 1 to 17 are views for explaining an embodiment according to the present invention and its modification example. FIG. 1 is a view schematically showing a vehicle comprising a heating plate. FIG. 2 is a view of the heating plate seen from a normal direction of a plate surface thereof. FIG. 3 is a cross-sectional view of the heating plate of FIG. 2.

As shown in FIG. 1, a motor vehicle 1 as an example of a vehicle has windowpanes such as a front window, a rear window, a side window and so on. Herein, an example in which the front window 5 is formed of a heating plate 10 is described. The motor vehicle 1 has a power supply 7 such as a battery which is typically a lead storage battery.

As shown in FIGS. 2 and 3, the heating plate 10 in this embodiment has a pair of substrates 11 and 12, a sheet with conductor 20 disposed between the pair of substrates 11 and 12, a pair of joint layers 13 and 14 which join the respective substrates 11 and 12 and the sheet with conductor 20. In the example shown in FIGS. 1 and 2, the heating plate 10 and the substrate 11, 12 are curved. However, in the other drawings, the heating plate 10 and the substrate 11, 12 are shown as flat plates for easy understanding.

The sheet with conductor 20 has a substrate 21, a patterned conductor 30 provided on a surface of the substrate 21, which surface faces the first substrate 11 (this surface corresponds to a placement surface 21S of the patterned conductor 30), the patterned conductor 30 including linear conductors 31, and a pair of bus bars 25 for energizing the patterned conductor 30.

As well shown in FIG. 2, the heating plate 10 has a wiring part 15 for energizing the patterned conductor 30. In the illustrated example, the power supply 7 such as a battery energizes the patterned conductor 30 from the wiring part 15 through the bus bars 25 of the sheet with conductor 20, so that the patterned conductor 30 generates heat by resistance heat. The heat generated by the patterned conductor 30 is transmitted to the substrates 11 and 12 so as to heat the substrates 11 and 12. Thus, the substrates 11 and 12 can be defogged. In addition, when snow or ice is on the substrates 11 and 12, the snow or ice can be unfrozen. Thus, an occupant's visibility can be well ensured.

In this specification, the terms "plate", "sheet" and "film" are not differentiated from one another, based only on the difference in terms. For example, a "sheet with conductor" is a concept including a member that can be referred to as plate or film. Thus, a "sheet with conductor" cannot be differentiated from a member referred to as "plate (substrate) with conductor" or "film with conductor", based only on the difference in terms.

Herebelow, respective constituent elements of the heating plate 10 are described.

The substrate 11, 12 is described firstly. When the substrate 11, 12 is used in a front window of a motor vehicle as shown in the example of FIG. 1, the substrate 11, 12 preferably has a high visible light transmittance in order not to disturb an occupant's visibility. A material of such a substrate 11, 12 is soda lime glass, for example. The visible light transmittance of the substrate 11, 12 is preferably not less than 90%. However, the substrate 11, 12 may be partially or entirely colored to lower the visible transmittance partially or entirely. In this case, direct rays of the sun can be interrupted and/or an inside of the vehicle can be less visible from outside.

In addition, the substrate 11, 12 preferably has a thickness of not less than 1 mm and not more than 5 mm. Such a thickness allows the substrate 11, 12 to be excellent in strength and optical characteristics. The pair of substrates 11 and 12 may be made of the same material and have the same structure. Alternatively, the pair of substrates 11 and 12 may differ from each other at least in one of a material and a structure.

Next, the joint layer 13, 14 is described. The first joint layer 13 is disposed between the first substrate 11 and the sheet with conductor 20 so as to join the first substrate 11 and the sheet with conductor 20 with each other. The second joint layer 14 is disposed between the second substrate 12 and the sheet with conductor 20 so as to join the second substrate 12 and the sheet with conductor 20.

As such a joint layer 13, 14, a layer made of any material having adhesiveness or viscosity can be used. The joint layer 13, 14 preferably has a high visible light transmittance. A typical joint layer may be a layer made of polyvinyl butyral (PVB), for example. A thickness of the joint layer 13, 14 is preferably not less than 0.15 mm and not more than 1 mm. The pair of joint layers 13 and 14 may be made of the same material and have the same structure. Alternatively, the pair of joint layers 13 and 14 may differ from each other at least in one of a material and a structure. Alternatively, it is possible to add about 0.01 to 10 mass % of a known ultraviolet absorbing agent, such as a benzotriazole-based compound, a benzophenone compound, etc., to one or both of the pair of joint layers 13 and 14, so as to impart thereto an ultraviolet shielding function described later.

Not limited to the illustrated examples, the heating plate 10 may be provided with another function layer that fulfills a predetermined function. One functional layer may fulfill two or more functions. For example, it is possible to impart a certain function to at least one of the substrate 11, 12 of the heating plate 10, the joint layer 13, 14 thereof, and the below-described substrate 21 of the sheet with conductor 20. A function to be given to the heating plate 10 may be an antireflective (AR) function, a hard coat (HC) function having an abrasion-resistant property, an infrared shielding (reflecting) function, an ultraviolet shielding (reflecting) function, an antifouling property, and so on, for example.

Next, the sheet with conductor 20 is described. The sheet with conductor 20 has the substrate 21, the patterned conductor 30 provided on a surface of the substrate 21, which surface faces the first substrate 11, the patterned conductor 30 including the linear conductor 31, and the pair of bus bars 25 for energizing the patterned conductor 30. The sheet with conductor 20 may have substantially the same planar dimension as that of the substrate 11, 12 and may be disposed all over the heating plate 10. Alternatively, the sheet with conductor 20 may be disposed only on a part of the heating plate 10, such as a part in front of a driver's seat in the example of FIG. 1.

The substrate 21 functions as a substrate that supports the patterned conductor 30. One surface of the substrate 21 forms the placement surface 21S. The substrate 21 is a so-called transparent, electrically insulative film that transmits a wavelength of a visible light wavelength band (380 nm to 780 nm). Any material can be used for the substrate 21, as long as the material transmits visible light and can appropriately support the patterned conductor 30. For example, the material may be a linear or thermoplastic polyester resin such as polyethylene terephthalate, polyethylene naphthalate, ethylene glycol—terephthalic acid—isophthalic acid copolymer, a polyolefin resin such as polyethylene polypropylene, annular polyolefin, a polycarbonate resin, polystyrene, polyvinyl chloride, and so on. In consideration of a light transmittance and an appropriate support capability of the patterned conductor 30, the substrate 21 has preferably a thickness of not less than 0.03 mm and not more than 0.20 mm.

The "transparent" heating plate means that the heating plate has a transparency that allows the heating plate to be seen from one side of the heating plate through the other side thereof, and has a visible light transmittance of, for example, not less than 30%, preferably not less than 70%. A visible light transmittance is specified, when a transmittance of measured wavelengths in a range between 380 nm to 780 nm is measured by using a spectrophotometer (manufactured by Shimadzu Co., Ltd., "UV-3100PC" in reference to JISK0115), as an average value of transmittances in respective wavelengths. In particular, in the case of a heating plate forming a front window of a motor vehicle, the heating plate 10 that is laminated and joined as shown in FIG. 3 is required to have a visible light transmittance of not less than 70%. Thus, a visible light transmittance of the patterned conductor 30 itself is preferably not less than 80%.

The patterned conductor 30 has the linear conductor 31 disposed between the pair of bus bars 25. The linear conductor 31 is energized from the power supply 7 such as a battery through the wiring part 15 and the bus bars 25 so as to generate heat by resistance heat. The heat is transmitted to the substrates 11 and 12 through the joint layers 13 and 14, so that the substrates 11 and 12 are heated.

The linear conductor 31 may be arranged in various patterns. In the example shown in FIG. 4, the patterned conductor 30 is formed such that, in a plan view of the patterned conductor 30 when seen from a normal direction (which is the Z-axis direction in FIG. 4 and generally corresponds to a normal direction of the surface of the heating plate 10) of the placement surface 21S of the patterned conductor 30, the linear conductor 31 is arranged in a mesh-like pattern defining a lot of identical regular hexagonal openings 33 to fill the plan surface without any gap. A honeycomb or testudinal pattern is formed. The patterned conductor 30 includes a plurality of connection elements 34 extending between two branch points 32 to define the openings 33. Namely, the linear conductor 31 of the patterned conductor 30 is formed as an assembly of a lot of the connection elements 34 which define the branch points 32 at both ends thereof. The mesh-like pattern is not limited to a periodic lattice in which the openings 33 of the same shape and size have a certain repeat cycle in the plan surface, but may be an irregular mesh pattern in which openings of different shapes and sizes do not have a certain repeat cycle in the plan surface.

When a distance between centers of gravity of the openings 33 is excessively large, non-uniform heat generation occurs in the patterned conductor 30. Thus, an average distance between the centers of gravity of the openings 33 is preferably not more than 3000 μm. When the distance between the centers of gravity of the openings 33 is excessively small, a transmittance is degraded to impair a see-though property. Thus, an average distance between the centers of gravity of the openings 33 is preferably not less than 50 μm.

Figure 5:
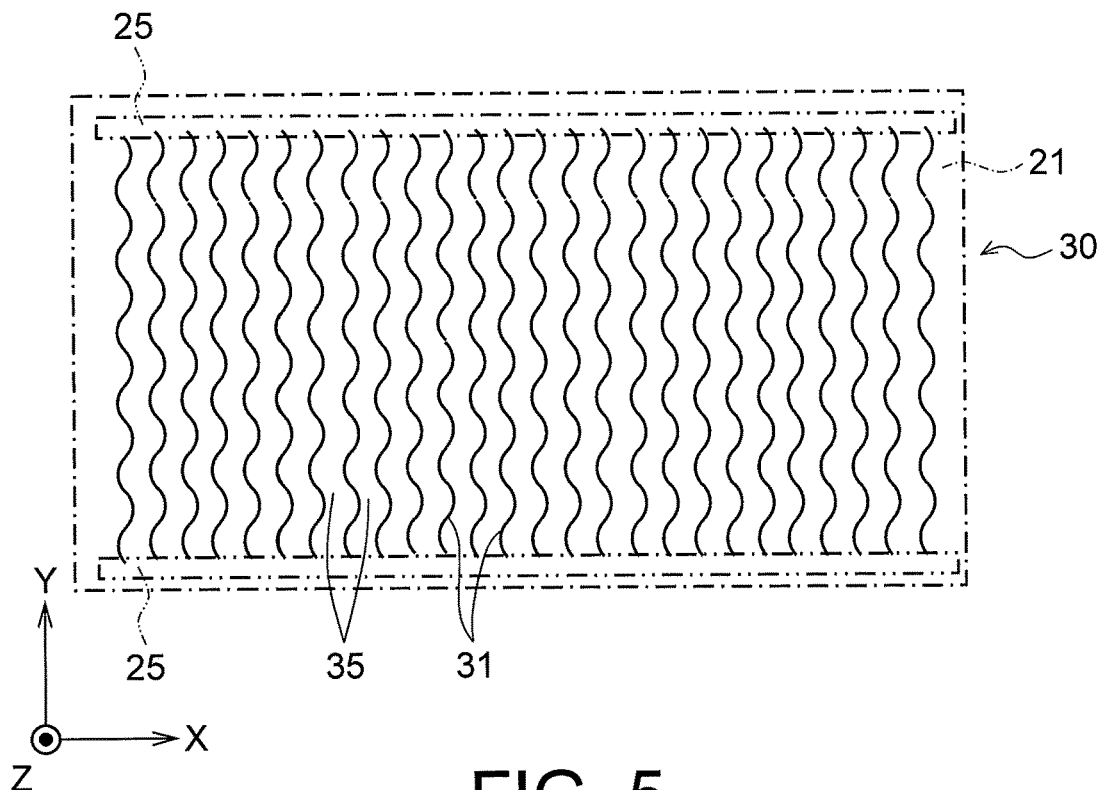
FIG. 5 is a plan view showing a patterned conductor included in the heating plate of FIG. 1, which shows another example of an arrangement pattern of a linear conductor forming the patterned conductor.

On the other hand, as in the example shown in FIG. 5, the patterned conductor 30 may be formed of a plurality of the linear conductors 31 connecting the pair of bus bars 25. In the example shown in FIG. 5, the plurality of linear conductors 31 are arranged with gaps 35 therebetween in one direction. Each linear conductor 31 extends in a direction not parallel to the one direction. In the example shown in FIG. 5, the linear conductors 31 extend all over the patterned conductor 30 in a direction not parallel to the one direction, rather than that the linear conductors 31 only partially extend in a direction not parallel to the one direction. Each linear conductor 31 extends from one bus bar 25 to the other bus bar 25. The linear conductors 31 are arranged apart from one another in a direction not parallel to the extension direction of the linear conductors 31. In particular, the linear conductors 31 are arranged in a direction orthogonal to the extension direction of the linear conductors 31. Thus, the gap 35 is formed between the adjacent two linear conductors 31.

When each gap 35 is excessively large, non-uniform heat generation occurs in the patterned conductors 30. Thus, the size of the gap 35, i.e., an average distance between the adjacent linear conductors 31 is preferably not more than 1200 µm. When the gap 35 is excessively small, a transmittance is degraded to impair a see-though property. Thus, an average distance between the adjacent linear conductors 31 is preferably not less than 100 µm.

A material for constituting such a patterned conductor 30 may be one or more of gold, silver, copper, platinum, aluminum, chrome, molybdenum, nickel, titanium, palladium, indium, tungsten, or an alloy of them containing one or more of these metals, for example. In order to stably ensure below-described metal crystal grains, the linear conductor 31 preferably contains at least one of copper and aluminum, i.e., the linear conductor 31 preferably contains one of copper, aluminum and an alloy containing at least one or more of these metals.

The patterned conductor 30 may be formed by using an opaque metal material, as described above. On the other hand, a ratio of an area on the substrate 21, which is not covered with the patterned conductor 30, i.e., a not-coverage ratio (also referred to as opening ratio) is as high as not less than 70% and not more than 99%. In addition, a line width of the linear conductor 31 is about not less than 2 µm and not more than 20 µm. Thus, the area on which the patterned conductor 30 is provided is perceived to be transparent as a whole, whereby the presence of the patterned conductor 30 does not interfere with the see-through property of the heating plate 10.

In the example shown in FIG. 3, the linear conductor 31 has a main cut surface that is rectangular as a whole. A width W of the linear conductor 31, i.e., the width W along the plate surface of the heating plate 10 is preferably not less than 2 µm and not more than 20 µm, and a height (thickness) H, i.e., the height (thickness) H along the normal direction to the plate surface of the heating plate 10 is preferably not less than 1 µm and not more than 40 µm. According to the linear conductor 31 having such dimensions, since the linear conductor 31 is sufficiently narrow, the patterned conductor 30 can be made effectively invisible.

The linear conductor made of the aforementioned material has a high conductivity while having relatively a high reflectance. When light is reflected by the linear conductor 31 of the patterned conductor 30, the reflected light can be seen. Thus, it is difficult to clearly see a background observed through the heating plate 10. Thus, particularly when the patterned conductor 30 is installed in a window of a vehicle such as a motor vehicle, an occupant's visibility may be interfered. In addition, when the linear conductor 31 can be seen from outside, a design may be degraded. Thus, the linear conductor 31 may include a conductive metal layer made of the aforementioned material, and a dark color layer (not shown) that at least partially covers the conductive metal layer. The dark color layer may be any layer having a visible light reflectance lower than that of the conductive metal layer. The dark color layer exhibits, for example, dark colors such as an achromatic color of a lower luminosity such as black or charcoal, or a chromatic color of a lower luminosity such as brown, navy, dark green, dark purple or dark red. As a dark color layer material, black iron oxide ($Fe_3O_4$), carbon, copper oxide (copper oxide (II) CuO), copper nitride, copper nitride oxide, copper-cobalt alloy or the like may be used. The dark color layer makes it difficult to see the conductive metal layer, so that the occupant's visibility can be well ensured. In addition, the design when seen from outside can be prevented from being degraded.

Figure 7:
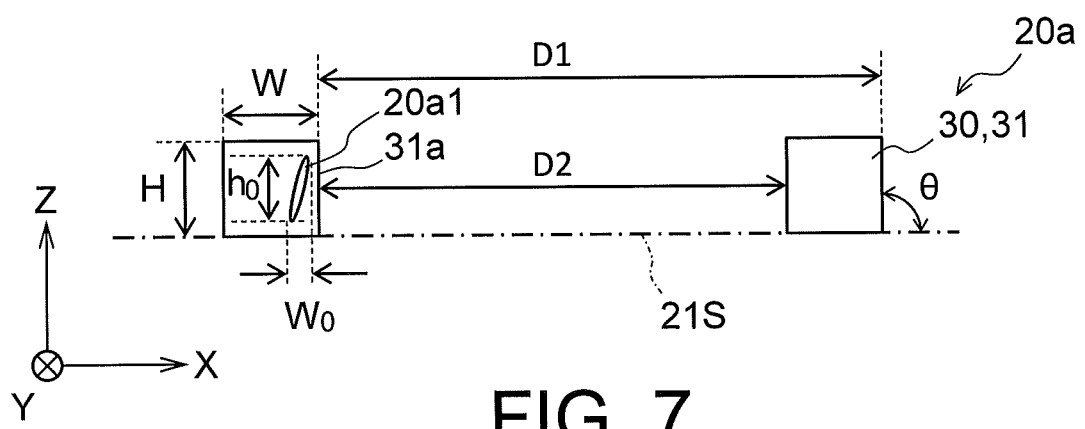
FIG. 7 is a sectional view of a main cut surface showing an example of a patterned conductor.
Figure 15:
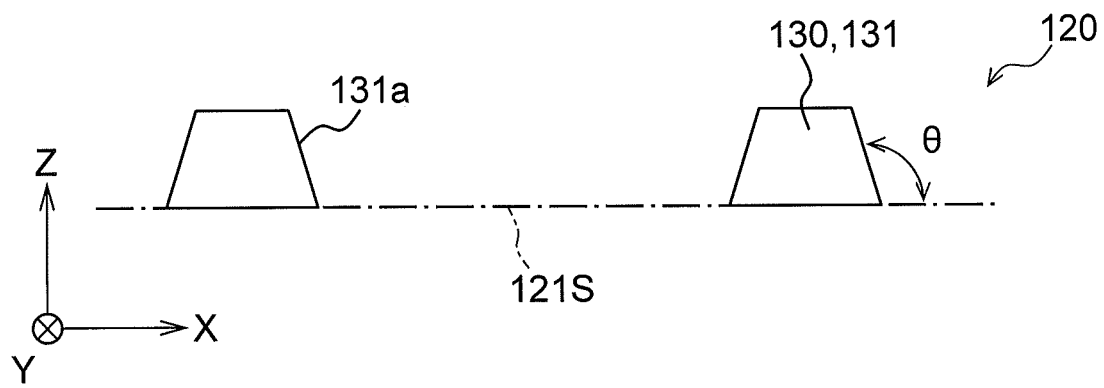
FIG. 15 is a sectional view corresponding to FIG. 7, which shows a main cut surface of an example of a conventional patterned conductor.

As has been described above, the conventional problem is that a side surface in a main cut surface shape of a linear conductor is inclined. As shown in FIG. 15, when a side surface 131a in a main cut surface shape of a linear conductor 131 is inclined with respect to a normal direction (in the illustrated example, a normal direction of the sheet with conductor 120) to the surface (one surface of a substrate 121) on which a patterned conductor 130 is supported, a main cut surface area becomes smaller as compared with a visible width, which impairs the conductivity. Alternatively, when the main cut surface area is increased, a visible width becomes larger, which impairs the see-through property. In the patterned conductor 30 described in this embodiment, a crystal grain structure of the linear conductor 31 forming the patterned conductor 30 is controlled so as to effectively prevent that the side surface 31a of the linear conductor 31 in the main cut surface shape is largely inclined to the normal direction to the surface (one surface of the substrate 21) on which the patterned conductor 30 is supported, as shown in FIG. 7. In particular, the combination of the control and the fact that the patterned conductor 30 is manufactured by a patterning using a below-described photolithographic technique enables the linear conductor 31 to stably have a steep side surface. Herebelow, a crystal grain structure of the linear conductor 31 is described.

Figure 6:
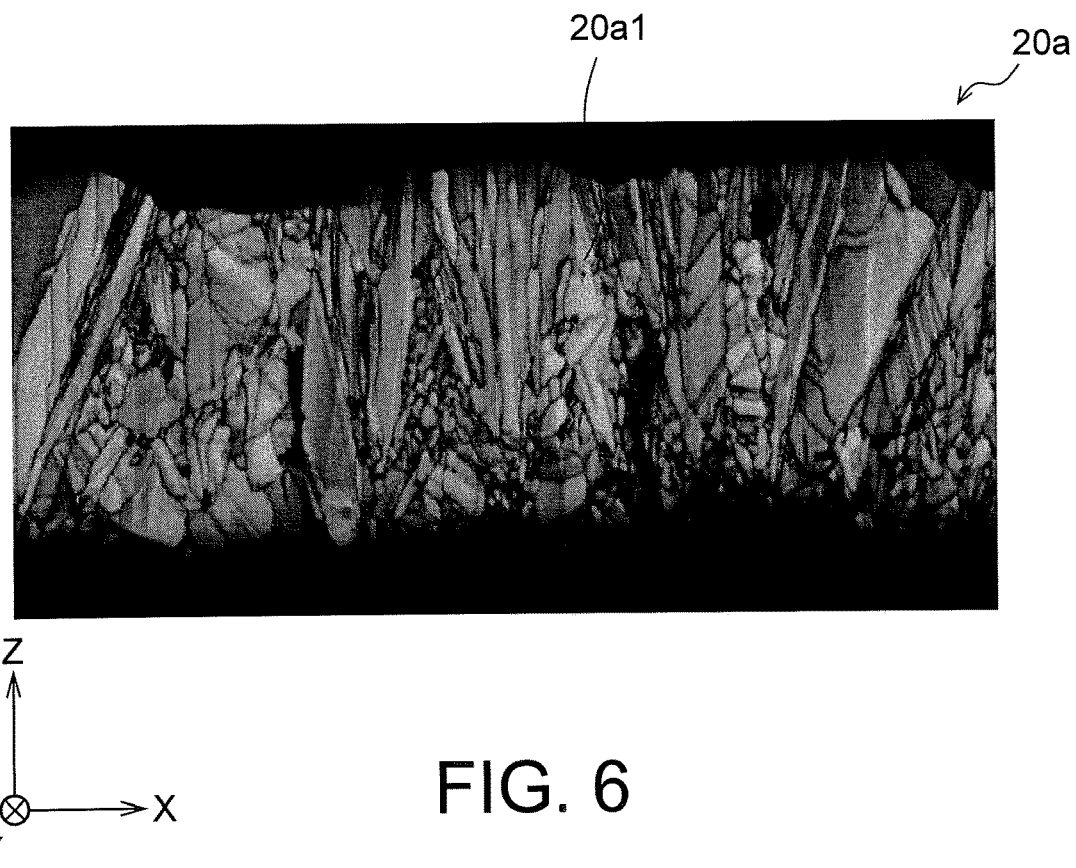
FIG. 6 is a picture showing a section of a metal film used in the manufacture of a patterned conductor, the section being taken along a normal direction of its front and rear surfaces.

The linear conductor 31 includes a plurality of metal crystal grains in a section orthogonal to its longitudinal direction, i.e., in the main cut surface. FIG. 6 is a picture of a section of a metal film 20a according to the present invention along a normal direction thereof, the meal film 20a being not yet patterned to form the patterned conductor 30. In this specification, a metal crystal grain is a single crystal grain that is separated by a crystal grain boundary. In this example, the crystal grain boundary does not include a twin boundary. The twin is one crystal solid in which two crystal grains are joined with holding a certain crystallographic relationship therebetween. A shape and a size of a crystal grain boundary and a metal crystal grain can be measured by means of SEM (model number: JSM-7001F) manufactured by JEOL Ltd. and EBSD (model number: OTM software Ver. 6.2) manufactured by TSL. Co. On the other hand, FIG. 7 is a view showing the patterned conductor 30 in a section along a normal direction to the placement surface on which the linear conductor 31 of the patterned conductor 30 is placed. FIG. 7 schematically shows a metal crystal grain, in addition to the linear conductor 31, the opening area 33 or the gap 35. In this embodiment, one surface of the substrate 21 corresponds to the placement surface 21S. FIG. 7 shows a section orthogonal to the longitudinal direction of the linear conductor 31, i.e., the main cut surface. When the patterned conductor 30 does not include the substrate 21, the placement surface 21S is a virtual surface. As shown in FIG. 7, the linear conductor 31 has, in its main cut surface, a height H along the normal direction to the placement surface 21S, and a width W along the placement surface 21S. The height H of the linear conductor 31 is a minimum height of a height of the linear conductor 31 in the main cut surface in the normal direction to the placement surface 21S. In addition, although FIG. 7 shows the placement surface 21S as a flat surface, the placement surface 21S may be a curved surface when the patterned conductor 30 is curved.

Each metal crystal grain has, in the main cut surface of the linear conductor 31, a length $w_0$ along the placement surface 21S, and a length $h_0$ along the normal direction to the placement surface 21S of the patterned conductor 30. The metal crystal grains include a metal crystal grain 20a1 wherein, in this section, the length $h_0$ along the normal direction to the placement surface 21S is larger than one third of the height H of the linear conductor 31. As shown in FIG. 7, for example, in the metal crystal grain 20a1, a minimum value of a ratio $h_0/w_0$, which is a ratio of the length $h_0$ along the normal direction to the placement surface 21S with respect to the length $w_0$ along the placement surface 21S is not less than 1.2, preferably not less than 1.9, more preferably not less than 2.5, further preferably not less than 4.0.

In addition, in the metal crystal grain 20a1 wherein, in the main cut surface of the linear conductor 31, the length $h_0$ along the normal direction to the placement surface 21S is larger than one third of the height H of the linear conductor 31, an average h of the length $h_0$ is not less than 4.0 μm and not more than 11.5 μm, an average w of the length $w_0$ along the placement surface 21S is not less than 0.5 μm and not more than 5.0 μm, and an average of a value of a ratio $h_0/w_0$, which is a ratio of the length $h_0$ along the normal direction to the placement surface 21S with respect to the length $w_0$ along the placement surface 21S, is not less than 2, preferably not less than 4.

Alternatively, regarding the metal crystal grain 20a1 wherein, in the main cut surface of the linear conductor 31, the length $h_0$ along the normal direction to the placement surface 21S is larger than one third of the height H of the linear conductor 31, an average of a diameter of a circle having the same area as an area of the metal crystal grain 20a1 is smaller than a half of the height H.

In addition, in the metal crystal grain 20a1 wherein, in the main cut surface of the linear conductor 31, the length $h_0$ along the normal direction to the placement surface 21S is larger than one third of the height H of the linear conductor 31, a value of a ratio W/w, which is a ratio of the width W of the linear conductor 31 with respect to an average w of the length $w_0$ along the placement surface 21S, is not less than 2 and not more than 10.

Figure 4:
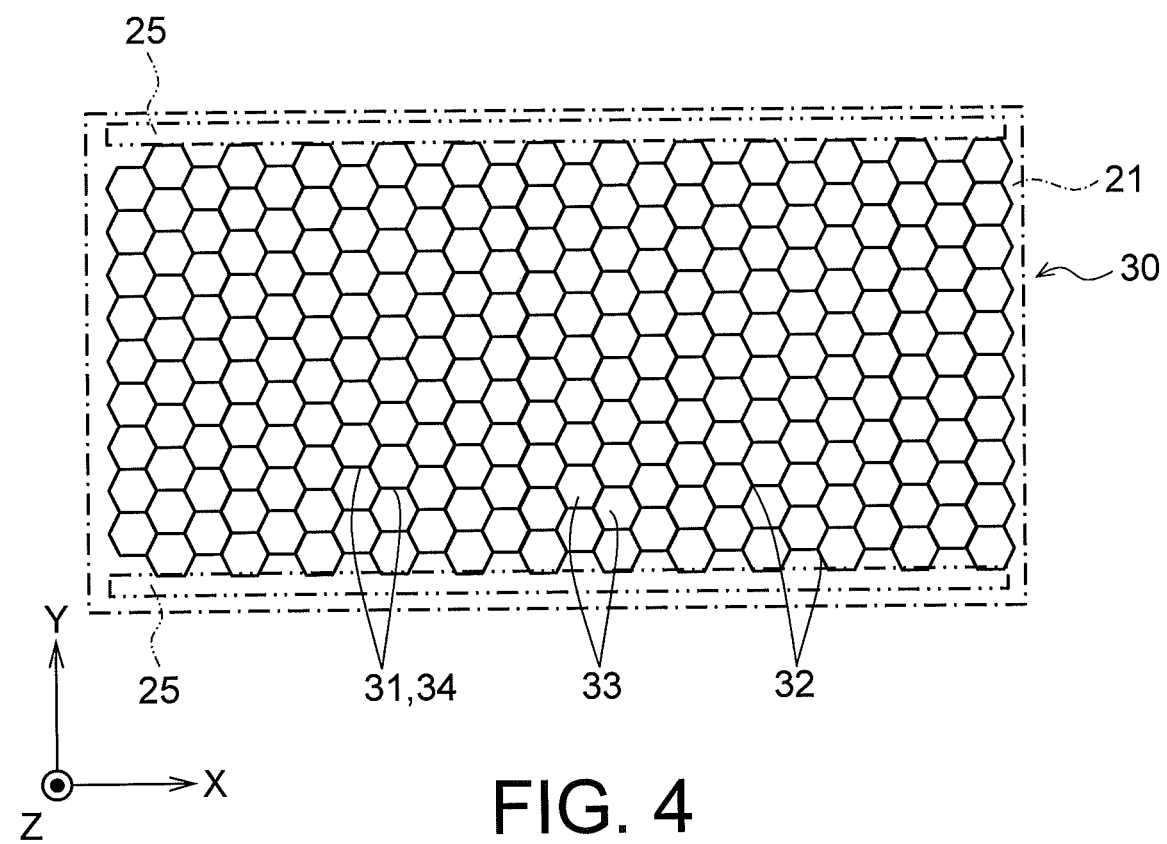
FIG. 4 is a plan view showing a patterned conductor included in the heating plate of FIG. 1, which shows an example of an arrangement pattern of linear conductors forming the patterned conductor.

Here, suppose that the patterned conductor 30 is arranged in a pattern in which a plurality of the opening areas 33 are defined as shown in FIG. 4. As shown in FIG. 7, a value of a ratio D1/W, which is a ratio of an average D1 of a distance between centers of gravity of the opening areas 33 with respect to the width W of the linear conductor 31, is not less than 50 and not more than 200. Further, in the metal crystal grain 20a1 wherein, in the main cut surface of the linear conductor 31, the length $h_0$ along the normal direction to the placement surface 21S is larger than one third of the height H of the linear conductor 31, a value of a ratio D1/w, which is a ratio of the average D1 of a distance between centers of gravity of the opening areas 33 with respect to the average w of the length $w_0$ along the placement surface 21S, is not less than 40 and not more than 500.

Alternatively, suppose that the patterned conductor 30 is arranged in a pattern in which the gaps 35 are formed in one direction as shown in FIG. 5. As shown in FIG. 7, a value of a ratio D2/W, which is a ratio of an average D2 of a dimension of the gap 35 along the one direction with respect to the width W of the linear conductor 31, is not less than 50 and not more than 1000. Further, in metal crystal grains 20a1 wherein, in the main cut surface of the linear conductor 31, the length $h_0$ along the normal direction to the placement surface 21S is larger than one third of the height H of the linear conductor 31, a value D2/w, which is a ratio of the average D2 of a dimension of the gap 35 along the one direction with respect to the average w of the length w0 along the placement surface 21S, is not less than 200 and not more than 240.

A shape and an orientation of metal crystal grains can be controlled in the course of its manufacturing process. To be specific, when a patterned conductor is manufactured by patterning the metal film 20a, a shape and an orientation of metal crystal grains contained in the metal film 20a can be controlled by adjusting a condition upon manufacture of the metal film 20a. As a specific example, the metal film 20a may be a film that is obtained by copper electrolytic refining. In the metal film 20a obtained by the electrolytic refining, a metal crystal grain in the metal film extends in a growth direction by the electrolytic refining. In particular, a direction in which a metal crystal grain extends can be controlled by adjusting a composition of a copper compound and another bath composition of a liquid (referred to also as bath) used in the electrolytic refining, and/or one or more conditions of a current density, a bath temperature and a bath stirring. As a bath composition, a copper sulfate bath, a cyanide copper bath, a pyrophosphoric acid copper bath and so on can be used. When the copper sulfate bath is used, by controlling one or more of a concentration of a copper sulfate pentahydrate (e.g., not less than 45 g/l and not more than 250 g/l), a concentration of nickel supplied as nickel sulfate (e.g., not less than 200 mg/l and not more than 1000 mg/l), a concentration of thiosulfuric acid or its thiosulfate such as sodium salt or potassium salt (e.g., not less than 100 mg/l and not more than 1000 mg/l), a concentration of sulfuric acid (e.g., not less than 30 g/l and not more than 250 g/l), a concentration of chlorine ion (e.g., not less than 5 mg/l and not more than 80 mg/l), a liquid temperature (e.g., not less than 15° C. and not more than 35° C.), and a current density (e.g., not less than 0.1 $A/dm^2$ and not more than 6 $A/dm^2$), a shape and an orientation of metal crystal grains can be controlled. In addition, when the metal film 20a is manufactured, a water-soluble protein may be added as an addition agent.

Figure 14:
FIG. 14 is a picture corresponding to FIG. 6, which shows a section of a metal film used in the manufacture of a conventional patterned conductor, the section being taken along a normal direction of its front and rear surfaces.

FIGS. 6 and 14 respectively show a sample 1 and a sample 2 of metal films having a thickness of 12 μm, which were manufactured by copper electrolytic refining. The samples 1 and 2 were manufactured under conditions different from each other, and had crystal grain structures different from each other. In the sample 1 shown in FIG. 6, each metal crystal gain has a longitudinal direction in the up and down direction (Z-axis direction) in FIG. 6, and has an orientation in which the longitudinal direction of the metal crystal grain extends along the normal direction of the metal film 20a. On the other hand, the sample 2 shown in FIG. 14 is a metal film used in a patterned conductor of the conventional technique. As compared with the sample 1 shown in FIG. 6, the metal crystal grains of the sample 2 has neither a clear orientation nor a clear regularity. Namely, the sample 1 is an example of the aforementioned embodiment, and the sample 2 is a comparative example with respect to the embodiment.

Next, an example of a manufacturing method of the sheet with conductor 20 having the patterned conductor 30 is described with reference to FIGS. 8 to 11. FIGS. 8 to 11 are sectional views sequentially showing an example of the manufacturing method of the sheet with conductor 20 having the patterned conductor 30.

Figure 8:
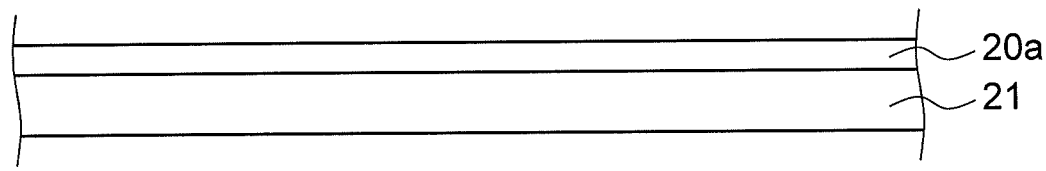
FIG. 8 is a view for explaining an example of a manufacturing method of a patterned conductor (sheet with conductor).

Firstly, as shown in FIG. 8, the metal film 20a forming the linear conductor 31 is provided on the substrate 21. The substrate 21 is selected among the aforementioned examples.

A shape and an orientation of metal crystal grains in the metal film 20a can be controlled by adjusting a manufacturing condition of the metal film 20a in various known copper plating methods. As a specific example, the metal film 20a is a metal film obtained by metal electrolytic refining. As described above, by adjusting a condition related to a liquid used in the electrolytic refining, a metal film in which metal crystal grains are oriented in a thickness direction can be manufactured.

Next, the fact that the crystal grain 20a1 of the metal film 20a satisfies the aforementioned shape is inspected. Namely, regarding a metal crystal grain 20a1 included in one section of the metal film 20a in which the length $h_0$ along the normal direction of the metal film 20a is larger than one third of the height H of the linear conductor 30 along the normal direction of the metal film 20a, the fact that a minimum value of a ratio ($h_0/w_0$), which is a ratio of the length $h_0$ of the metal crystal grain along the normal direction to the placement surface with respect to the length $w_0$ along the placement surface, is not less than 1.2, the fact that an average of a value of a ratio ($h_0/w_0$), which is a ratio of the length $h_0$ along the normal direction to the placement surface 21S with respect to the length $w_0$ along the placement surface 21S, is not less than 2, the fact that an average h of the length $h_0$ in this section along the normal line of the metal film 20a is not less than 4.0 μm and not more than 11.5 μm, and the fact that an average w of the length in this section along the metal film 20a is not less than 0.5 μm and not more than 5.0 μm, are inspected.

The aforementioned inspection step may be carried out before the metal film 20a is provided on the substrate 21. Namely, only the metal film 20a wherein the inspection results of the metal crystal grains are acceptable may be provided on the substrate 21.

Figure 9:
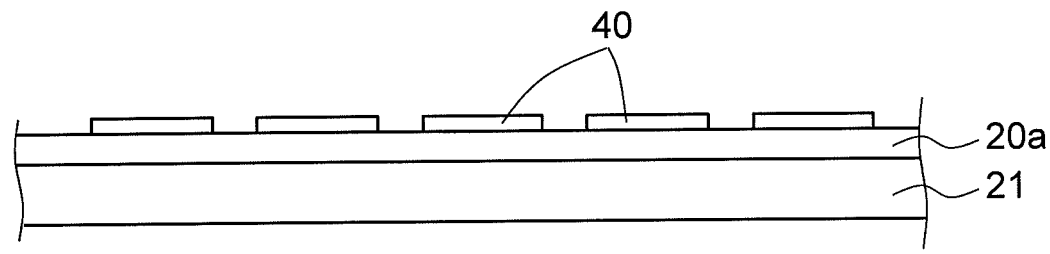
FIG. 9 is a view for explaining the example of a manufacturing method of a patterned conductor (sheet with conductor).

As shown in FIG. 9, the metal film 20a in which the inspection results of the metal crystal grains are acceptable is provided with a resist pattern 40. Although the resist pattern 40 has a shape corresponding to the patterned conductor 30 to be formed, a width of the resist pattern 40 is larger than a width of the linear conductor 31 of the patterned conductor 30 to be formed. For example, when the linear conductor 31 to be formed has a width of 5 μm, the resist pattern 40 has a width of 30 μm.

Figure 10:
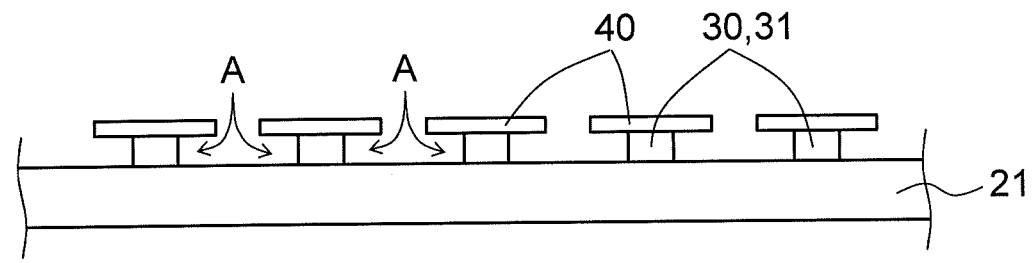
FIG. 10 is a view for explaining the example of a manufacturing method of a patterned conductor (sheet with conductor).

Then, as shown in FIG. 10, the metal film 20a is etched with the resist pattern 40 serving as a mask. As described above, when the width of the resist pattern 40 is sufficiently large with respect to the width of the linear conductor 31 to be formed, the etchant firstly dissolves the metal film 20a from a gap of the resist pattern 40. The etchant enters a dissolved part of the metal film 20a so as to dissolve the metal film 20a in a direction along the substrate 21, which is shown by the arrows A in FIG. 10. Namely, the etching develops laterally from the metal film 20a. The present inventors have confirmed that the etching is likely to develop for each metal crystal grain. Thus, when an extension direction of the metal crystal grains 20a1 in the metal film 20a is oriented in the normal direction of the metal film 20a as in this embodiment, the linear conductor 31 formed by the etching has a shape close to a rectangular shape in the main cut surface orthogonal to the longitudinal direction. It is presumed that, since the metal corrosion by the etching develops for each metal crystal grain, the side surface 31a of the linear conductor 31, which was formed by the etching, stands steeply in the normal direction of the metal film 20a which is the orientation direction of the metal crystal grains 20a. To be specific, in a section orthogonal to the longitudinal direction of the linear conductor 31, an outside angle θ of the linear conductor 31, which is defined between the side surface 31a of the linear conductor 31 and the placement surface 21S, is preferably as steep as about 90°, specifically 70°≤θ≤110°, preferably 80°≤θ≤100°.

The etching step is preferably carried out by ejecting an etchant at a temperature of not less than 40° with a spray pressure of not less than 0.1 MPa in a direction perpendicular to the metal film 20a, i.e., in a direction along the longitudinal direction of the elongated metal crystal grain 20a1. In this case, the etchant enters between crystal grain boundaries of elongated metal crystal grains, so that the etching step can be made stably to develop in every metal crystal grain 20a1. The spray pressure can be measured by installing a manometer on a spray from which the etchant is ejected.

Figure 12:
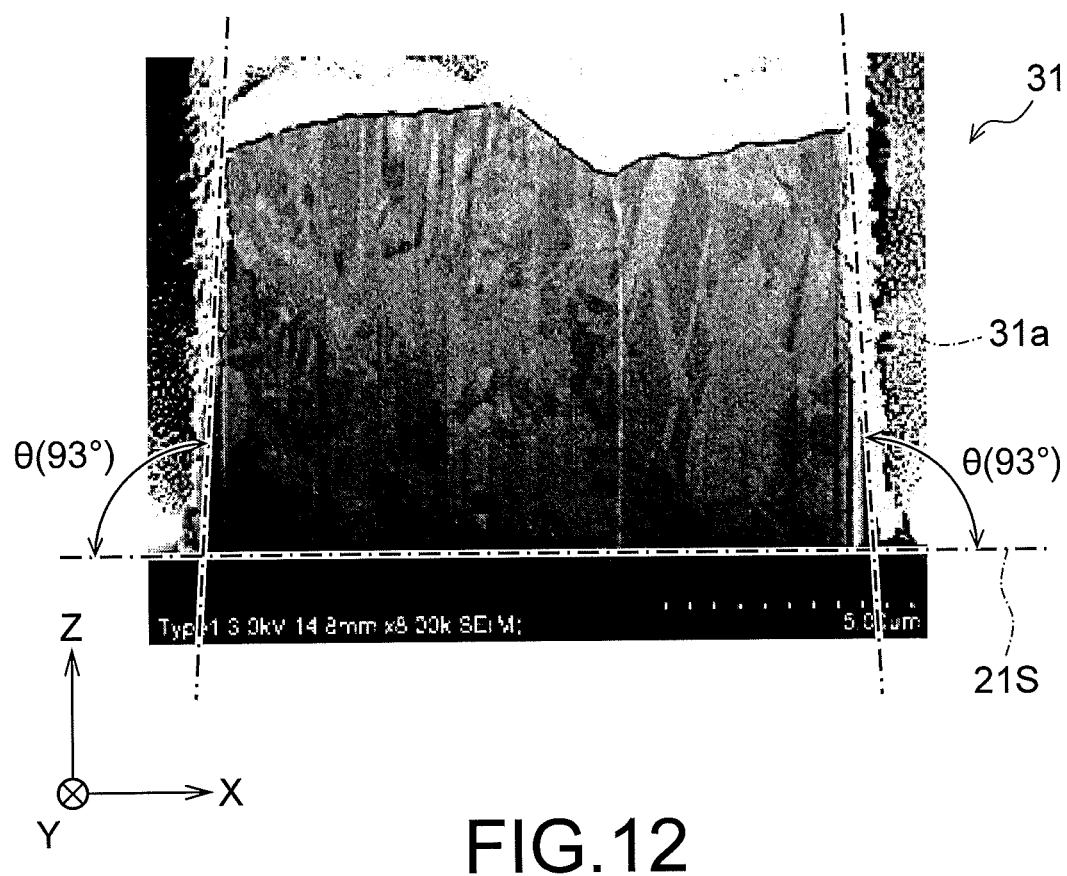
FIG. 12 is a picture showing a main cut surface of a linear conductor of a patterned conductor manufactured by patterning the metal film of FIG. 6.
Figure 16:
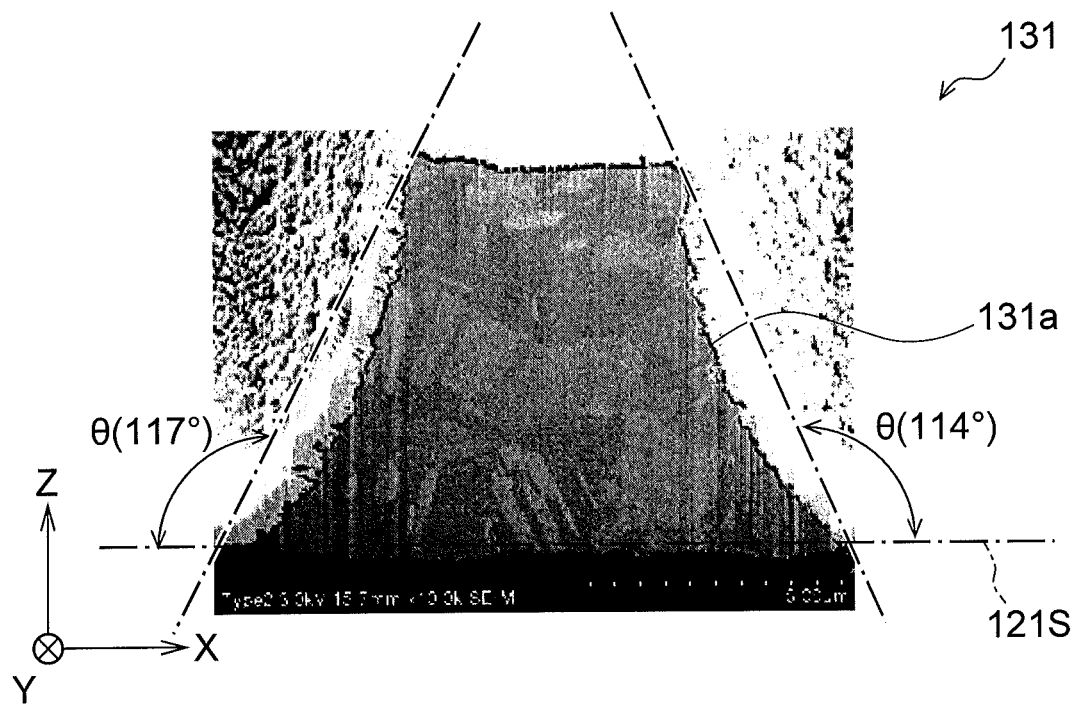
FIG. 16 is a picture of a main cut surface of a linear conductor of a patterned conductor manufactured by patterning the metal film of FIG. 14.

FIG. 12 is a picture showing a main cut surface of the linear conductor 31 of the patterned conductor 30 (patterned conductor according to the sample 1) manufactured by patterning the metal film 20a (metal film according to the sample 1) of FIG. 6. On the other hand, FIG. 16 is a picture showing a main cut surface of the linear conductor 131 of the patterned conductor 130 (patterned conductor according to the sample 2) manufactured by patterning the metal film 120a (metal film according to the sample 2) of FIG. 14. As shown in FIG. 12, when the metal film 20a (metal film according to the sample 1) of FIG. 6 in which the longitudinal direction of the metal crystal grain is oriented in the thickness direction is used, the side surface 31a of the linear conductor 31 of the manufactured patterned conductor 30 (patterned conductor according to the sample 1) stands steeply. In FIG. 12, an angle θ defined between the left side surface 31a and the placement surface 21S, and an angle θ defined between the right side surface 31a and the placement surface 21S are both 93°. Since the main cut surface has a shape close to a rectangular shape, the linear conductor 31 shown in FIG. 12 can have both an excellent see-through property and an excellent conductivity. On the other hand, as shown in FIG. 16, when the metal film 120a (metal film according to the sample 2) of FIG. 14 in which the crystal grain does not have a longitudinal direction, the side surface 131a of the linear conductor 131 of the manufactured patterned conductor 130 (patterned conductor according to the sample 2) is largely inclined from the normal direction of the surface on which the patterned conductor 130 is placed. In FIG. 16, an angle θ defined between the left side surface 131a and the placement surface 121S, and an angle θ defined between the right side surface 131a and the placement surface 121S are 117° and 114°, respectively. Since the main cut surface has a trapezoidal shape, the linear conductor shown in FIG. 16 can have neither an excellent see-through property nor an excellent conductivity, as compared with the linear conductor 31 shown in FIG. 12.

In the linear conductor 31 of the patterned conductor 30 according to the sample 1 (Example 1) and the linear conductor 131 of the patterned conductor 130 according to the sample 2 (Comparative Example), the below Table 1 shows, regarding metal crystal grains included in one section of the linear conductor 31, 131, which were 12 μm in height H and 10 μm in width W, measurement results of an average of diameters (equal area circle diameters, average grain diameter) of circles having the same areas as the areas of the metal crystal grains, a maximum value, a minimum value and an average of the lengths $h_0$ (longitudinal lengths) of the crystal grains along the normal direction to placement surface 21S, and a maximum value, a minimum value and an average of lengths $w_0$ (lateral lengths) of the metal crystal grains along the placement surface 21S. These values of the metal crystal grains in Table 1 are only about metal crystal grains in which, in the one section, the longitudinal length $h_0$ is larger than one third of the height H of the linear conductor.

In addition, a patterned conductor 30 according to a sample 3 was manufactured by using a sample 3 of a metal film manufactured under the same condition as that of the sample 1, in the same manufacturing method of the patterned conductor 30 according to the sample 1. Namely, the sample 3 is an example of this embodiment that is different from the sample 1. Regarding the linear conductor 31 of the patterned conductor 30 according to the sample 3 (Example 2), metal crystal grains included in one surface of the linear conductor 31, which were 12 μm in height H and 10 μm in width W were examined, similarly to the samples 1 and 2. Table 1 also shows the results of the patterned conductor 30 according to the sample 3.

TABLE 1

| | | Sample 1 (Example 1) | Sample 2 (Comparative Example) | Sample 3 (Example 2) |
|---|---|---|---|---|
| Average grain diameter (μm) | Average | 3.4 | 5.8 | 3.4 |
| Longitudinal length ($h_0$) (μm) | Minimum | 4.0 | 4.2 | 4.1 |
| | Average | 7.6 | 7.8 | 7.6 |
| | Maximum | 11.5 | 10.4 | 11.3 |
| Lateral length ($w_0$) (μm) | Minimum | 0.5 | 2.5 | 0.6 |
| | Average | 2.2 | 5.4 | 2.2 |
| | Maximum | 5.0 | 7.7 | 4.4 |
| Ratio $h_0/w_0$ | Minimum | 1.2 | 0.5 | 1.9 |
| | Average | 4.0 | 1.6 | 4.0 |
| | Maximum | 10.0 | 2.4 | 9.4 |

In the patterned conductor 30 according to the sample 1, regarding metal crystal grains 20a1 in which the longitudinal length $h_0$ was larger than one third of the height H (12 μm) of the linear conductor 31, a minimum value of a ratio ($h_0/w_0$), which was a ratio of the longitudinal length $h_0$ with respect to the lateral length $w_0$, was not less than 1.2. In addition, an average of diameters (equal area circle diameters, average grain diameter) of circles having the same areas as areas of the metal crystal grains 20a1 was smaller than a half of the height H of the linear conductor 31. Namely, there were metal crystal grains 20a1 that had an elongated shape and were oriented in the height (longitudinal) direction. In particular, in this example, an average of a value of a ratio ($h_0/w_0$), which was a ratio of the longitudinal length $h_0$ with respect to the lateral length $w_0$, was 4.0. Namely, it can be understood that the metal crystal grains 20a1 in the linear conductor 31 were oriented in the height (longitudinal) direction as a whole. Thus, as described above, the etching developed for each metal crystal grain, so that the main cut surface of the linear conductor 31 had a shape close to a rectangular shape. When the main cut surface has a shape close to a rectangular shape, the linear conductor 31 can be excellent both in see-through property and conductivity.

In the patterned conductor 30 according to the sample 3, regarding metal crystal grains 20a1 in which the longitudinal length $h_0$ was larger than one third of the height H (12 μm) of the linear conductor 31, a minimum value of a ratio ($h_0/w_0$), which was a ratio of the longitudinal length $h_0$ with respect to the lateral length $w_0$, was not less than 1.9. When there are such metal crystal grains 20a1, the aforementioned etching develops more stably for each metal crystal grain, whereby the main cut surface of the linear conductor 31 can more stably have a shape close to a rectangular shape. To be specific, when a minimum value of a ratio, which is a ratio of the longitudinal length $h_0$ with respect to the lateral length $w_0$, is not less than 1.9, an outside angle θ of the linear conductor 31, which is defined between the side surface 31a of the linear conductor 31 and the placement surface 21S, can be as steep as 70°≤θ≤110°. When the main cut surface has a shape closer to a rectangular shape, the linear conductor 31 can be more excellent both in see-through property and conductivity.

On the other hand, in the patterned conductor 130 according to the sample 2, an average of a value of a ratio ($h_0/w_0$), which was a ratio of the longitudinal length $h_0$ with respect to the lateral length $w_0$, was 1.6. Namely, it can be understood that the metal crystal grains in the linear conductor 131 practically did not have an orientation as a whole. Thus, when the etching develops in a metal crystal unit, the main cut surface shape of the linear conductor 131 becomes trapezoidal. As described above, when the main cut surface has a trapezoidal shape, neither an excellent see-through property nor an excellent conductivity can be achieved.

The patterned conductor 30 is manufactured by patterning the metal film 20a by means of the above etching step. The etching method in the etching step is not specifically limited, and known methods can be employed. For example, a wet etching using an etchant, a plasma etching and so on are known methods.

Figure 11:
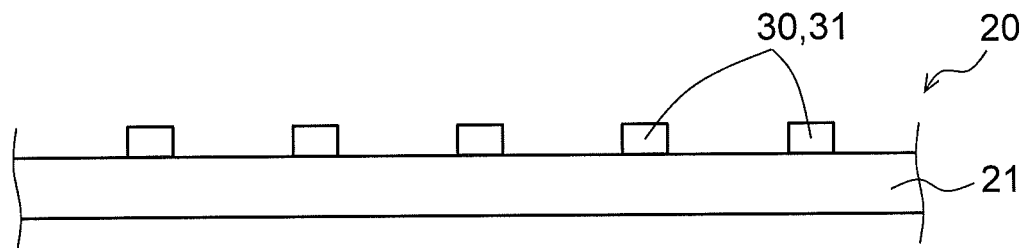
FIG. 11 is a view for explaining the example of a manufacturing method of a patterned conductor (sheet with conductor).

As shown in FIG. 11, following to the etching step, a resist pattern removal step for removing the resist pattern 40 is carried out, so as to obtain the sheet with conductor 20. The patterned conductor 30 is manufactured through the above-described respective steps. When the substrate 21 is unneeded, a peel layer may be provided between the metal film 20a and the substrate 21 shown in FIG. 8, in order to peel the substrate 21 later.

Figure 17:
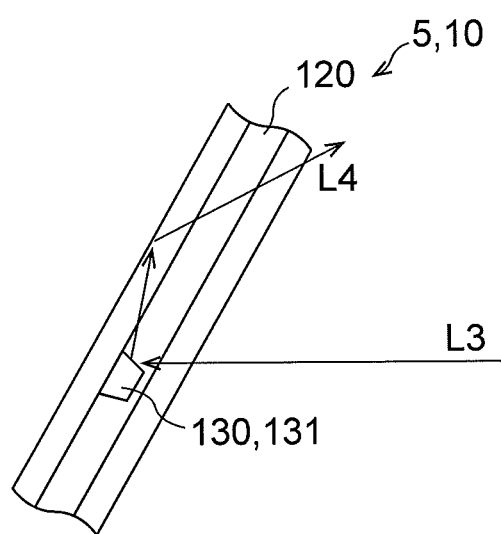
FIG. 17 is a view corresponding to FIG. 13, for explaining an effect of a conventional patterned conductor.

As shown in FIG. 15, in the conventional patterned conductor 30, in a section orthogonal to the longitudinal direction of the linear conductor 31, an outside angle θ of the linear conductor 31, which is defined between the side surface 31a of the linear conductor 31 and the placement surface 21S, exceeds 110°. When a heating plate 110 including such a patterned conductor 30 is used in a front window of a motor vehicle shown in FIG. 17, as shown in FIG. 17, when light L3 enters the front window from behind the motor vehicle, the light reflected by the outside surface 131a of the linear conductor 131 of the patterned conductor 130 may be totally reflected inside the heating plate 110 to become light L4 toward the inside of the motor vehicle, because of its small reflection angle. Such light L4 may impair a visibility of an occupant in the motor vehicle.

Figure 13:
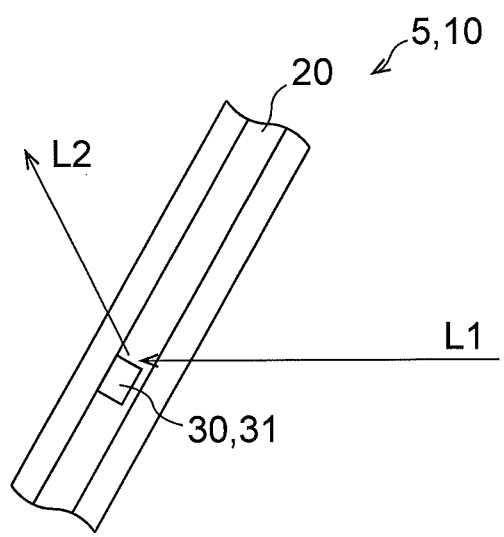
FIG. 13 is a view for explaining an effect of a patterned conductor.

On the other hand, in this embodiment, as shown in FIG. 12, in a section orthogonal to the longitudinal direction of the linear conductor 31, an outside angle θ of the linear conductor 31, which is defined between the side surface 31a of the linear conductor 31 and the placement surface 21S, is as steep as 70°≤θ≤110°. In this case, as shown in FIG. 13, where the heating plate 10 including the patterned conductor 30 is used in a front window 5 of a general motor vehicle, for example, when light L1 enters the front window 5 from behind the motor vehicle, the light L1 reflected by the outside surface 31a of the linear conductor 31 of the patterned conductor 30 is likely to become light L2 that goes out from the motor vehicle. Thus, even when light enters the front window from behind the motor vehicle, a visibility of an occupant in the motor vehicle is unlikely to be impaired. In particular, in a case where an outside angle θ of the linear conductor 31, which is defined between the side surface 31a of the linear conductor 31 and the placement surface 21S, is as steep as 80°≤θ≤100°, even when light L1 that enters a window from one side thereof, which window is not limited to a window of a general motor vehicle but may be a window of any vehicle, is reflected by the outside surface 31a of the linear conductor 31 of the patterned conductor 30, the light L1 is likely to become light L2 that goes out to the other side. Thus, a visibility of an occupant in the vehicle is more unlikely to be impaired.

As described above, according to this embodiment, the patterned conductor 30 comprises the metal linear conductor 31 positioned on the placement surface 21S (in the illustrated example, one surface of the substrate 21) on which the patterned conductor 30 is placed, the linear conductor 31 includes, in its main cut surface, a plurality of metal crystal grains, and the linear conductor 31 includes, in one main cut surface of the linear conductor 31, a metal crystal grain(s) 20a1 having a length $h_0$ along a normal direction to the surface on which the patterned conductor 30 is placed, which length is larger than one third of a height H of the linear conductor 31 along the normal direction to the surface on which the patterned conductor 30 is placed, in which a minimum value of a ratio ($h_0/w_0$), which is a ratio of the length $h_0$ of the metal crystal grain(s) 20a1 along the normal direction to the surface on which the patterned conductor 30 is placed with respect to the length $w_0$ along the surface on which the patterned conductor 30 is placed, is not less than 1.2. According to such a patterned conductor 30, the patterning develops for each metal crystal grain. When the patterning using a photolithographic technique is carried out, the etching of the metal film 20a develops for each metal crystal grain upon etching. As a result, there is no possibility that the side surface 31a of the manufactured linear conductor 31 is largely inclined with respect to the normal direction of the surface on which the patterned conductor 30 is placed. The main cut surface of the linear conductor forming the patterned conductor has a shape close to a rectangular shape. Since the main cut surface has a shape close to a rectangular shape, a visible width of the linear conductor 31 can be made smaller while a sectional area can be made larger. Namely, the patterned conductor 30 can have both a high conductivity and a high see-through property.

Alternatively, according to this embodiment, the patterned conductor 30 comprises the metal linear conductor 31 positioned on the placement surface 21S (in the illustrated example, one surface of the substrate 21) on which the patterned conductor 30 is placed, the linear conductor 31 includes, in its main cut surface, a plurality of metal crystal grains, and the linear conductor 31 includes, in one main cut surface of the linear conductor 31, a metal crystal grain(s) 20a1 having a length $h_0$ along a normal direction to the surface on which the patterned conductor 30 is placed, which length is larger than one third of a height H of the linear conductor 31 along the normal direction to the surface on which the patterned conductor 30 is placed, in which an average of a diameter of a circle having the same area as an area of the metal crystal grain(s) is smaller than a half of the height H of the linear conductor 31 along the normal direction to the surface on which the patterned conductor 31 is placed. Also according to such a patterned conductor 30, the patterning may develop for each metal crystal grain. As a result, there is no possibility that the side surface 31a of the manufactured linear conductor 31 is largely inclined with respect to the normal direction of the surface on which the patterned conductor 30 is placed. The main cut surface of the linear conductor forming the patterned conductor has a shape close to a rectangular shape. Since the main cut surface has a shape close to a rectangular shape, a visible width of the linear conductor 31 can be made smaller while a sectional area can be made larger. Namely, the patterned conductor 30 can have both a high conductivity and a high see-through property.

In addition, in this embodiment, the linear conductor 31 forming the patterned conductor 30 contains at least one of copper and aluminum. According to such a patterned conductor 30, since the linear conductor is made of inexpensive metal having a good electric conductivity, a manufacturing cost of the patterned conductor 30 can be decreased, while a high conductivity can be obtained.

Further, in this embodiment, the linear conductor 31 is arranged in a pattern defining a plurality of opening areas 33, and a value of a ratio (D1/W), which is a ratio of an average D1 of a distance between centers of gravity of the opening areas 33 with respect to the line width W of the linear conductor 31, is not less than 50 and not more than 200. According to such a patterned conductor 30, since the opening area 33 is sufficiently larger than the width of the linear conductor 31, a see-through property of the patterned conductor 30 can be sufficiently ensured. In addition, since the opening area 33 is not excessively large with respect to the width of the linear conductor 31, a function of the patterned conductor, e.g., a function for uniformly generating heat when used as a defroster, can be achieved.

In addition, in this embodiment, the linear conductor 31 is arranged in a pattern defining a plurality of opening areas 33, and regarding the metal crystal grain included in one main cut surface orthogonal to the longitudinal direction of the linear conductor 31, and having a length $h_0$ along the normal direction to the surface on which the patterned conductor 30 is placed, which length is larger than one third of a height H of the linear conductor 31 along the normal direction to the surface on which the patterned conductor 30 is placed, a value of a ratio (D1/w), which is a ratio of an average D1 of a diameter of a distance between centers of gravity of the opening areas 33 with respect to an average w of a length along the placement surface 21S (in the illustrated embodiment, one surface of the substrate 21) on which the patterned conductor is placed in this main cut surface, is not less than 40 and not more than 500. According to such a patterned conductor 30, it is possible to obtain an interval between the linear conductors, which is sufficient for the etching to develop laterally from the linear conductor to be formed in the etching. The etching firstly develops from a gap of the resist pattern 40. When D1/w is not less than 40, the metal film is eroded from laterally by etching, so that the linear conductor 31 having a steep side surface can be formed. When the interval between the linear conductors 31 is too large, it may be difficult to control the etching. Thus, D1/w is preferably not more than 500.

Further, in the patterned conductor 30 in this embodiment, a plurality of the linear conductors 31 are arranged with gaps 35 therebetween in one direction, each linear conductor 31 extending in a direction not parallel to the one direction, and a value of a ratio (D2/W), which is a ratio of an average D2 of a dimension of the gap 35 with respect to the line width W of the linear conductor 31, is not less than 50 and not more than 1000. According to such a patterned conductor 30, since the gap 35 is sufficiently larger than the width of the conductor 31, a see-through property of the patterned conductor 30 can be sufficiently ensured. In addition, since the gap 35 is not excessively large with respect to the width of the linear conductor 31, a function of the patterned conductor, e.g., a function for uniformly generating heat can be achieved.

In addition, in this embodiment, a plurality of the linear conductors 31 are arranged with gaps 35 therebetween in one direction, each linear conductor 31 extending in a direction not parallel to the one direction, and regarding the metal crystal grain included in the one main cut surface of the linear conductor 31 and having the length $h_0$ along the normal direction to the surface on which the patterned conductor 30 is placed, which length is larger than one third of the height H of the linear conductor 31 along the normal direction to the surface on which the patterned conductor 30 is placed, a value of a ratio (D2/w), which is a ratio of an average D2 of a dimension of the gap 35 along the one direction with respect to an average w of a length along the surface on which the patterned conductor 30 is placed (in the illustrated embodiment, one surface of the substrate 21) in said section, is not less than 200 and not more than 2400. According to such a patterned conductor 30, it is possible to obtain an interval between the linear conductors, which is sufficient for the etching to develop laterally from the linear conductor to be formed in the etching. The etching firstly develops from a gap of the resist pattern 40. When D2/w is not less than 200, the metal film is eroded from laterally by etching, so that the linear conductor 31 having a steep side surface can be formed. When the gap 35 between the linear conductors 31 is excessively large, it may be difficult to control the etching. Thus, D2/w is preferably not more than 2400.

Further, in this embodiment, regarding the metal crystal grain included in the one main cut surface of the linear conductor 31 and having the length $h_0$ along the normal direction to the surface on which the patterned conductor 30 is placed, which length is larger than one third of the height H of the linear conductor 31 along the normal direction to the surface on which the patterned conductor 30 is placed, a value of a ratio (W/w), which is a ratio of the line width W of the linear conductor 31 with respect to with respect to the average w of a length along the surface (in the illustrated embodiment, one surface of the substrate 21) in said section, is not less than 2 and not more than 10. According to such a patterned conductor 30, the sufficient number of metal crystal grains are included with respect to the width of the linear conductor 31. Since the etching develops for each metal crystal grain, the etching can be made to develop sufficiently finely. Thus, by controlling the etching, the main cut surface of the linear conductor 31 can be made close to a rectangular shape. Namely, the patterned conductor 30 can have both a high conductivity and a high see-through property. However, when the metal crystal grains are excessively fine with respect to the width of the linear conductor 31, the metal crystal grains are likely to be collapsed. Thus, it is impossible that the main cut surface of the linear conductor 31 has a rectangular shape during etching. Thus, as in this embodiment, W/w is preferably not less than 2 and not more than 10.

In addition, in this embodiment, regarding the metal crystal grain included in the one main cut surface of the linear conductor 31 and having the length $h_0$ along the normal direction to the surface on which the patterned conductor 30 is placed, which length is larger than one third of the height H of the linear conductor 31 along the normal direction to the surface on which the patterned conductor 30 is placed, an average of a value of a ratio ($h_0/w_0$), which is a ratio of the length $h_0$ of the metal crystal grain along the normal direction in this section with respect to the width $w_0$ along the surface (in the illustrated embodiment, one surface of the substrate 21) on which the patterned conductor 30 is placed in this section, is not less than 2. According to such a patterned conductor 30, in this section, the orientation of the metal crystal grain having a large sectional area is along the normal direction of the surface (in the illustrated embodiment, one surface of the substrate 21) on which the patterned conductor 30 is placed. Thus, by the etching, the main cut surface of the linear conductor 31 can be made close to a rectangular shape. Namely, the patterned conductor 30 can have both a high conductivity and a high see-through property.

Further, in this embodiment, regarding the metal crystal grain included in the one main cut surface of the linear conductor 31 and having the length $h_0$ along the normal direction to the surface on which the patterned conductor 30 is placed, which length is larger than one third of the height H of the linear conductor 31 along the normal direction to the surface on which the patterned conductor 30 is placed, an average h of a length $h_0$ along the normal direction in this section is not less than 4.0 μm and not more than 11.5 μm. According to such a patterned conductor 30, the length $h_0$ along the normal direction to the surface (in the illustrated embodiment, one surface of the substrate) on which the patterned conductor 30 is placed can be made larger than one third of the height H of the linear conductor 31 along the normal direction to the surface on which the patterned conductor 30 is placed, while the etching can be made to develop for each metal crystal grain. Thus, the patterned conductor 30 can have both a high conductivity and a high see-through property.

In addition, in this embodiment, regarding the metal crystal grain included in the one main cut surface of the linear conductor 31 and having the length $h_0$ along the normal direction to the surface on which the patterned conductor 30 is placed, which length is larger than one third of the height H of the linear conductor 31 along the normal direction to the surface on which the patterned conductor 30 is placed, an average w of a length $w_0$ along the surface (in the illustrated embodiment, one surface of the substrate) on which the patterned conductor 30 is placed is not less than 0.5 μm and not more than 5.0 μm. According to such a patterned conductor 30, when the ratio W/w is not less than 2 and not more than 10, the linear conductor 31 having the line width W that is not less than 2 μm and not more than 20 μm can be manufactured to have both a high conductivity and a high see-through property.

The above-described embodiment can be various modified. Herebelow, examples of modifications are described.

In FIG. 4, the patterned conductor 30 is formed of the openings 33 all of which are the same regular hexagons, but the present invention is not limited thereto. The respective openings 33 of the patterned conductor 30 may not be the same in shape and size. Namely, at least some of these openings 33 may differ from other openings 33 in shape or size, or in shape and size.

For example, the respective openings 33 of the patterned conductor 30 may be formed of a tetragon(s), a pentagon(s), a hexagon(s), a heptagon(s) and an octagon(s). The openings 33 may have different areas within a distribution between a certain upper limit value and a certain lower limit value. Such a patterned conductor is disclosed in, for example, JP5224203B, JP2012-178556A, etc.

In addition, in FIG. 3, the sheet with conductor 20 is formed by laminating the patterned conductor 30 on one surface of the substrate 21, but the present invention is not limited thereto. For example, the substrate 21 can be omitted, and the sheet with conductor 20 formed by only the patterned conductor 30 may be laminated between the first joint layer 13 and the second joint layer 14 in FIG. 3 (other structure is the same as FIG. 3).

A manufacturing method of such a heating plate 10 is described. For example, the first joint layer 13 and the sheet with conductor 20 on which the pattered conductor 30 is laminated on one surface of the substrate 21, which is shown in FIG. 11, are overlapped on the first substrate 11 such that the patterned conductor 30 of the sheet with conductor 20 faces the first joint layer 13. Then, the overlapped body is pressurized while being heated, so that the respective layers are laminated and integrated. Then, only the substrate 21 is peeled to be removed from the obtained laminate, so as to obtain a laminate in which the first substrate 11, the first joint layer 13 and the patterned conductor 30 are laminated in this order. Then, the second joint layer 14 and the second substrate 12 are overlapped in this order on the patterned conductor 30 of the laminated body. Thereafter, the overlapped body is pressurized while being heated, so that the respective layers are laminated and integrated. By means of these steps, the heating plate in which only the substrate 21 is omitted from the laminate of the laminate of FIG. 3.

The patterned conductor 30 incorporated in the heating plate 10 may be used in a front window, a side window and a sunroof of a motor vehicle. In addition, the patterned conductor 30 incorporated in the heating plate 10 can be used in a window or a transparent door of a vehicle such as a railroad vehicle, an aircraft, a ship, a space vehicle and the like, in addition to a motor vehicle.

In addition, the heating plate 10 including the patterned conductor 30 can be used as a patterned conductor incorporated particularly in a location separating an inside and an outside, e.g., a window of a building, a shop and a house, or a building window such as a transparent door.

Moreover, the patterned conductor 30 can be used as a conductor used in a touchpanel sensor.

DESCRIPTION OF REFERENCE NUMERALS

1 Motor vehicle
5 Front window
7 Power supply
10 Heating plate
11 First substrate
12 Second substrate
13 First joint layer
14 Second joint layer
15 Wiring part
20 Sheet with conductor
20a Metal film
20a1 Metal crystal grain
21 Substrate
25 Bus bar
30 Patterned conductor
31 Linear conductor
31a Side surface
32 Branch point
33 Opening
34 Connecting element
35 Gap
40 Resist pattern

The invention claimed is:

1. A patterned conductor comprising a metal linear conductor positioned on a placement surface,
wherein:
the linear conductor includes, in a section orthogonal to a longitudinal direction thereof, a plurality of metal crystal grains;
the linear conductor includes, in one section orthogonal to the longitudinal direction thereof, a metal crystal grain(s) having a length $h_0$ along a normal direction to the placement surface, which length is larger than one third of a height H of the linear conductor along the normal direction to the placement surface, in which a minimum value of a ratio ($h_0/w_0$), which is a ratio of the length $h_0$ of the metal crystal grain(s) along the normal direction to the placement surface with respect to a length $w_0$ along the placement surface, is not less than 1.2;
a plurality of the linear conductors are arranged with a gap(s) therebetween in one direction, each linear conductor extending in a direction not parallel to the one direction; and
regarding a metal crystal grain(s) included in the one section and having the length $h_0$ along the normal direction to the placement surface, which length is larger than one third of the height H of the linear conductor along the normal direction to the placement surface, a value of a ratio (D2/w), which is a ratio of an average D2 of a dimension of the gap along the one direction with respect to an average w of a length along the placement surface in said section, is not less than 200 and not more than 2400.

2. A patterned conductor comprising a metal linear conductor positioned on a placement surface,
wherein:
the linear conductor includes, in a section orthogonal to a longitudinal direction thereof, a plurality of metal crystal grains;
the linear conductor includes, in one section orthogonal to the longitudinal direction thereof, a metal crystal grain(s) having a length $h_0$ along a normal direction to the placement surface is larger than one third of a height H of the linear conductor along the normal direction to the placement surface, in which an average of a diameter of a circle having the same area as an area of the metal crystal grain(s) is smaller than a half of the height H of the linear conductor along the normal direction to the placement surface;
a plurality of the linear conductors are arranged with a gap(s) therebetween in one direction, each linear conductor extending in a direction not parallel to the one direction; and
regarding a metal crystal grain(s) included in the one section and having the length $h_0$ along the normal direction to the placement surface, which length is larger than one third of the height H of the linear conductor along the normal direction to the placement surface, a value of a ratio (D2/w), which is a ratio of an average D2 of a dimension of the gap along the one direction with respect to an average w of a length along the placement surface in said section, is not less than 200 and not more than 2400.

3. The patterned conductor according to claim 1, wherein the linear conductor contains at least one of copper and aluminum.

4. The patterned conductor according to claim 1, wherein a value of a ratio (D2/W), which is a ratio of an average D2 of a dimension of the gap along the one direction with respect to a line width W of the linear conductor, is not less than 50 and not more than 1000.

5. The patterned conductor according to claim 1, wherein regarding a metal crystal grain(s) included in the one section and having the length $h_0$ along the normal direction to the placement surface, which length is larger than one third of the height H of the linear conductor along the normal direction to the placement surface, a value of a ratio (W/w), which is a ratio of a line width W of the linear conductor with respect to an average w of a length along the placement surface in said section, is not less than 2 and not more than 10.

6. The patterned conductor according to claim 1, wherein regarding a metal crystal grain(s) included in the one section and having the length $h_0$ along the normal direction to the placement surface, which length is larger than one third of the height H of the linear conductor along the normal direction to the placement surface, an average of a value of a ratio ($h_0/w_0$), which is a ratio of the length $h_0$ of the metal crystal grain along the normal direction in said section with respect to the width $w_0$ along the placement surface in said section, is not less than 2.

7. The patterned conductor according to claim 1, wherein regarding a metal crystal grain(s) included in the one section and having the length $h_0$ along the normal direction to the placement surface, which length is larger than one third of the height H of the linear conductor along the normal direction to the placement surface, an average h of a length along the normal direction in said section is not less than 4.0 μm and not more than 11.5 μm.

8. The patterned conductor according to claim 1, wherein regarding a metal crystal grain(s) included in the one section and having the length $h_0$ along the normal direction to the placement surface, which length is larger than one third of the height H of the linear conductor along the normal direction to the placement surface, an average w of a length along the placement surface in said section is not less than 0.5 μm and not more than 5.0 μm.

9. The patterned conductor according to claim 1, wherein in a section orthogonal to the longitudinal direction of the linear conductor, an outside angle θ of the linear conductor, which is defined between the side surface of the linear conductor and the placement surface, is 70°≤θ≤110°.

10. A sheet with conductor comprising:
the patterned conductor according to claim 1; and
a substrate supporting the patterned conductor.

11. A heating plate comprising the patterned conductor according to claim 1.

12. A vehicle comprising the heating plate according to claim 11.

13. A manufacturing method of a patterned conductor including a metal linear conductor positioned on one placement surface, the manufacturing method comprising:

a step of providing a metal film on a substrate;
a step of providing a resist pattern on the metal film, and etching the metal film with the resist pattern serving as a mask; and
a step of removing the resist pattern;
wherein:
in one section of the metal film, the metal film includes a metal crystal grain(s) having a length $h_0$ along a normal direction of the metal film, which length is larger than one third of a height H along the normal direction of the metal film, in which a minimum value of a ratio ($h_0/w_0$), which is a ratio of the length $h_0$ of the metal crystal grain(s) along the normal direction of the metal film with respect to a length $w_0$ along the placement surface is not less than 1.2;
a plurality of the linear conductors are arranged with a gap(s) therebetween in one direction, each linear conductor extending in a direction not parallel to the one direction; and
regarding a metal crystal grain(s) included in the one section and having the length $h_0$ along the normal direction to the placement surface, which length is larger than one third of the height H of the linear conductor along the normal direction to the placement surface, a value of a ratio (D2/w), which is a ratio of an average D2 of a dimension of the gap along the one direction with respect to an average w of a length along the placement surface in said section, is not less than 200 and not more than 2400.

14. The manufacturing method of a patterned conductor according to claim 13, further comprising a step of inspecting the metal crystal grain(s) of the metal film.

15. The manufacturing method of a patterned conductor according to claim 14, wherein
the step of inspecting the metal crystal grain(s) of the metal film includes a step of inspecting that, regarding a metal crystal grain(s) included in the one section and having the length $h_0$ along the normal direction of the metal film, which length is larger than one third of the height H of the linear conductor along the normal direction of the metal film, a minimum value of a ratio ($h_0/w_0$), which is a ratio of the length $h_0$ of the metal crystal grain(s) along the normal direction of the metal film with respect to the length $w_0$ along the metal film in said section, is not less than 1.2.

16. The manufacturing method of a patterned conductor according to claim 15, wherein
the step of inspecting the metal crystal grain(s) of the metal film further includes at least one of the steps of:
regarding a metal crystal grain(s) included in the one section and having the length $h_0$ along the normal direction of the metal film, which length is larger than one third of the height H along the normal direction of the metal film,
a step of inspecting that an average of a value of a ratio ($h_0/w_0$), which is a ratio of the length $h_0$ of the liquid crystal grain along the normal direction of the metal film with respect to the length $w_0$ of the liquid crystal grain along the metal film in said section, is not less than 2;
a step of inspecting that an average h of the length of the metal crystal grain along the normal direction of the metal film in said section is not less than 4.0 μm and not more than 11.5 μm; and
a step of inspecting that an average w of the length of the metal crystal grain along the metal film in said section is not less than 0.5 μm and not more than 5.0 μm.

* * * * *